United States Patent
Thompson et al.

[15] 3,699,481
[45] Oct. 17, 1972

[54] LOW VELOCITY HIGHLY ANISOTROPIC ELASTIC MATERIALS

[72] Inventors: Robert B. Thompson; Donald O. Thompson, both of Thousand Oaks; Edgar A. Kraut, Camarillo; Teong C. Lim, Thousand Oaks, all of Calif.

[73] Assignee: North American Rockwell Corporation, El Segundo, Calif.

[22] Filed: June 1, 1971

[21] Appl. No.: 148,766

[52] U.S. Cl. .............. 333/30 R, 181/33 R, 181/33 G
[51] Int. Cl. .......................... E04b 1/86, H03h 7/30
[58] Field of Search....181/27 A, 33 G, 33 R, 33 GA; 333/29, 29 S, 30 R, 70 S, 81 R, 81 A, 98 R

[56] References Cited

UNITED STATES PATENTS

| | | | |
|---|---|---|---|
| 3,347,335 | 10/1967 | Watters et al. | 181/31 B |
| 3,400,341 | 9/1968 | Sittig | 333/30 R |
| 2,684,724 | 7/1954 | Kock | 333/30 R |
| 2,875,435 | 2/1959 | McMillan | 333/81 X |
| 2,477,852 | 8/1949 | Bacon | 181/33 G |
| 3,016,315 | 1/1962 | Robinson | 181/36 B |
| 3,110,369 | 11/1963 | Ruzicka | 181/33 G |
| 3,118,118 | 1/1964 | Watts | 333/98 X |
| 3,136,380 | 6/1964 | McCoy et al. | 181/33 G |
| 3,310,761 | 3/1967 | Brauer | 333/30 R |
| 3,504,761 | 4/1970 | Sullivan et al. | 181/42 UX |

*Primary Examiner*—Robert S. Ward, Jr.
*Attorney*—L. Lee Humphries, H. Fredrick Hamann and Joseph E. Kieninger

[57] ABSTRACT

This invention discloses a class of materials having a cellular structure which is suitable to slow the movement or velocity of elastic waves therein. An example of this class of materials is a cellular phenolic honeycomb polymer in which an elastic wave has a delay time of 0.6 milliseconds per inch in contrast to a delay time of 0.005 milliseconds per inch obtained in quartz, the most widely used prior art material. By proper modification of the cellular structure parameters, that is, the thickness of the individual cell wall and the dimensions of the individual cell, a particular desired elastic wave velocity in a given direction can be obtained.

2 Claims, 1 Drawing Figure

PATENTED OCT 17 1972
3,699,481
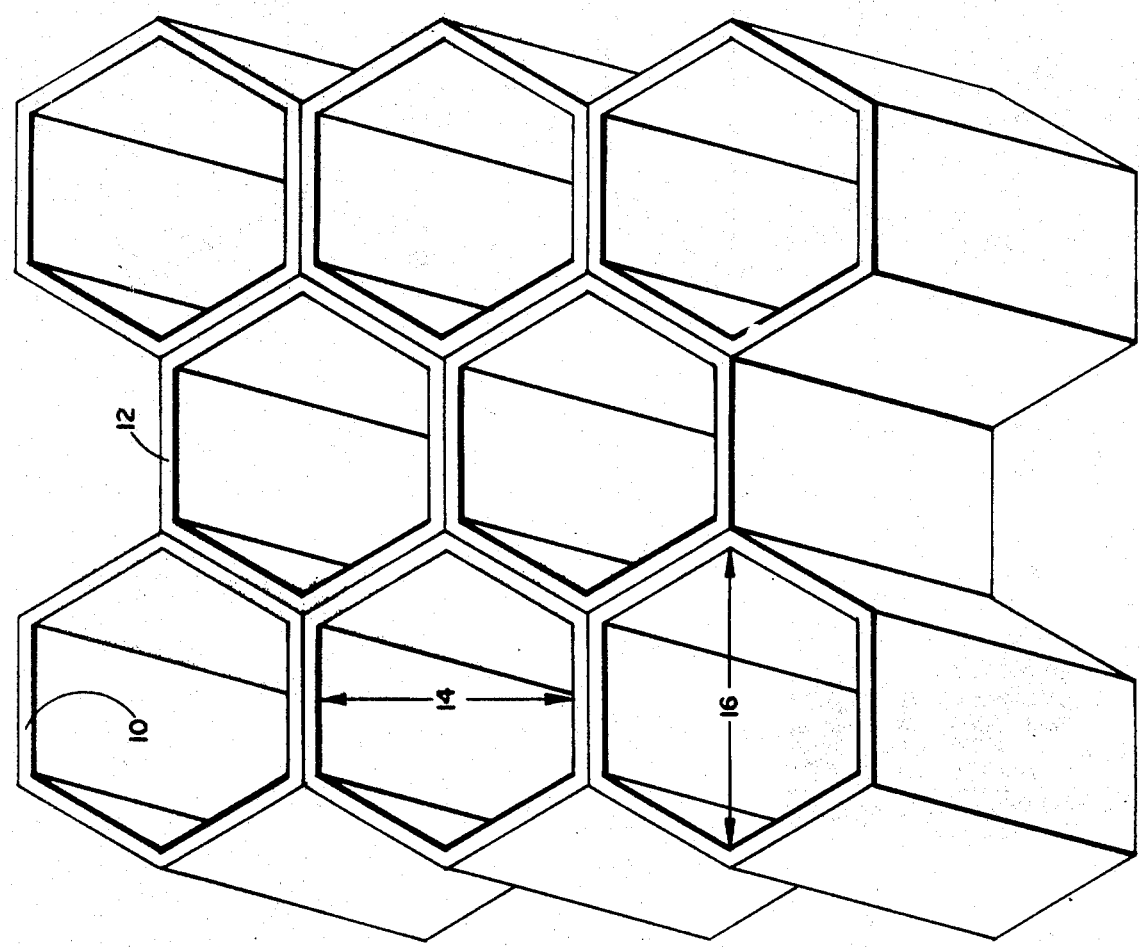
INVENTORS
ROBERT B. THOMPSON
DONALD O. THOMPSON
BY EDGER A. KRAUT
TEONG C. LIM
Joseph E. Kieninger
ATTORNEY

LOW VELOCITY HIGHLY ANISOTROPIC ELASTIC MATERIALS

FIELD OF THE INVENTION

This invention relates to elastic waves and more particularly to a class of materials which slow the velocity of the elastic waves.

BRIEF DESCRIPTION OF PRIOR ART

Elastic waves such as surface acoustic waves and bulk acoustic waves are used in a variety of applications. One of the better known uses is delay lines which provide delay or storage of signal pulses in certain radar systems, sonar systems, organ systems, computer memories, switching systems and the like. Recent advances in the development of elastic wave circuit devices such as amplifiers, modulators, detectors and filters provide numerous areas in which circuit functions which are presently difficult or expensive to perform electrically can be done the use of elastic waves.

A typical prior art delay line, for example, comprises a uniform elastic wave supporting medium disposed between a pair of transducers. In operation, one of the transducers is excited by an electrical input signal and induces an elastic wave in the medium. The wave propagates through the medium as a shear or longitudinal wave and impinges upon the second transducer which reconverts the wave into an electrical signal at the output. Since the velocity of propagation of an elastic wave is much lower than that of an electrical signal, relatively large delays can thus be obtained.

Prior art materials which are presently being used for delay line mediums are quartz, lithium niobate, beryllium oxide, and the like. In materials of this type, elastic waves are delayed of the order of 0.005 milliseconds per inch.

SUMMARY OF THE INVENTION

It is an object of this invention to provide an improved elastic wave medium.

It is another object of this invention to provide a medium in which an elastic wave has a long delay time.

It is still another object of this invention to provide an elastic wave medium which sustains a slow velocity.

It is yet another object of this invention to provide an elastic wave medium that is highly anisotropic.

It is still another object of this invention to provide a method of synthesizing a material in which an elastic wave medium has a specified delay time.

It is another object of this invention to provide an elastic wave medium in which the velocity of an elastic wave can be varied from one region to another region within the medium.

These and other objects of this invention are provided by a class of materials having a cellular structure. The velocity of an elastic wave in this class of materials is primarily determined by the thickness of the individual cell wall, the height of the individual cell in the direction of propagation, and the length of the individual cell transverse to the direction of propagation. The velocity of elastic waves decreases as the wall thickness and/or height of the individual cell decreases.

IN THE DRAWING

The drawing depicts the cellular structure of the material.

DETAILED DESCRIPTION OF AN EMBODIMENT

In general, this invention covers a class of materials having a cellular structure which slows the velocity of elastic waves therein in a particular direction. These materials are highly anisotropic, that is, the material will slow the movement of the elastic wave in one direction through the material a given amount and will slow the movement of an elastic wave a different amount in another direction. The extensional velocity, $V_E$, of the elastic wave in the cellular material is approximated by the equation:

$$V_E = \sqrt{E_0/\rho}\ \sqrt{1/2K}\ h l_1/l_2^2$$

where $E_o$ is Young's modulus in dynes/cm$^2$ $\rho$ is density in gm/cm$^3$ $K$ is a constant greater than 1 which is the ratio of the arc of the cell to $l_2$ $h$ is the thickness of the individual cell wall $l_1$ is the height of the individual cell in the direction of propagation, and $l_2$ is the length of the individual cell transverse to the direction of propagation.

It is believed that this class of materials has a superior ability to slow the velocities of elastic waves passing therethrough due to the flexing of the individual cell walls. It is understood, of course, that this invention is not limited to the theory set forth above.

As shown in the drawing, a cellular structure 10 has walls 12 with a thickness $h$. The walls 12 are separated a distance 14 in a first direction and a distance 16 in a second direction transverse to the first direction. The velocity of the elastic waves passing through the structure 10 depends primarily upon the particular direction of propagation, that is, the 1, 2 or 3 direction. The effect of the direction of propagation on the velocity of an elastic wave is shown in the following example.

EXAMPLE I

The elastic wave velocities in a cellular structure formed of a phenolic honeycomb sold under the trade name of Hexcell HRP 3/16-GF11-4.0 is shown in the following tables. The first table illustrates that the velocity of the extensional elastic waves in the 1 direction of propagation and in the 2 direction of propagation are slower than in the direction 3 of propagation.

TABLE I

Extensional Elastic Waves

| Direction of Propagation | Direction of Polarization | Velocity (cm/sec) |
|---|---|---|
| 1 | E | 4.0 × 10$^3$ |
| 2 | E | 5.6 × 10$^3$ |
| 3 | E | 2.2 × 10$^5$ |

In Table II, the velocities are given for the longitudinal elastic waves. The velocities in direction 1 and 2 of propagation are slower than in direction 3. This example illustrates that the flexing of the individual cell walls is responsible for the slow velocity of the elastic wave in directions 1 and 2. In direction 3, the longitudinal wave passes through the material in a manner so as not to flex the walls of the cell.

TABLE II

Longitudinal Elastic Waves

| Direction of Propagation | Direction of Polarization | Velocity (cm/sec) |
|---|---|---|
| 1 | 1 | $5.6 \times 10^3$ |
| 2 | 2 | $7.9 \times 10^3$ |
| 3 | 3 | $2.2 \times 10^5$ |

Table III lists the velocity for the shear elastic waves in which a similar phenomina is observed as in the case of the longitudinal and extensional elastic waves:

TABLE III

Shear Elastic Waves

| Direction of Propagation | Direction of Polarization | Velocity (cm/sec) |
|---|---|---|
| 1 | 2 | $3.8 \times 10^3$ |
| 1 | 3 | $1.1 \times 10^5$ |
| 2 | 1 | $3.8 \times 10^3$ |
| 2 | 3 | $1.5 \times 10^5$ |
| 3 | 1 | $1.1 \times 10^5$ |
| 3 | 2 | $1.5 \times 10^5$ |

The phenolic cellular material parameters were measured and found to be: $h = 0.004$ inch, $l_1 = l_2 = 0.188$ inch, $K = 1.5$ and $E^o/\rho_o = 2.2 \times 10^5$. Inserting these measured values into the equation set forth above, the predicted $V_{1E} = 2.7 \times 10^3$ cm/sec., which is in good agreement with the measured value of $4.0 \times 10^3$ presented in Table I.

The data illustrate that the velocity of elastic waves, including longitudinal, extensional and shear waves, given the proper direction of propagation and the proper direction of polarization, will have a slower velocity than that of the prior art material quartz, which was of the order of $6 \times 10^5$ cm/sec.

The cellular structure of this class of materials may be formed of a plastic material, such as the phenolic honeycomb material referred to earlier or metal, for example, aluminum, steel, copper and the like. The cellular structure may also be a ceramic, such as foam, or other inorganic materials.

The class of materials having a cellular structure may be utilized in a number of ways other than the uniform cellular structure shown in the drawing. In certain applications, it is desirable to take advantage of the wave slowing effect of this class of materials to focus or guide elastic waves. This may be accomplished in several ways.

One way to accomplish this result would be to have a cellular structure of uniform cell size and wall thickness in which the outer dimensions of the structure are varied from one region to another.

A similar effect may also be accomplished by using a cellular structure with constant outer dimensions in which the individual cell size is varied from one region to another region.

Another way to accomplish this effect is by using a cell structure with constant outer dimensions in which the individual cell wall thickness is varied from one region to another region.

We claim:

1. A method of slowing elastic waves in a medium comprising the steps of converting an electrical input signal into said elastic waves; passing said elastic wave through a body having a plurality of thin-walled cells forming a cellular structure, said cells having a preselected thickness $h$ of the individual cell wall, a preselected height $l_1$ of the individual cell in the direction of passing of said elastic wave and a preselected length $l_2$ of the individual cell transverse to the direction of said elastic wave, the parameters being selected with respect to a predetermined extensional velocity $V_E$ in accordance with the following equation:

$$V_E = \sqrt{E_{0/\rho}} \sqrt{1/2K}\, h l_{1/l_2}^2$$

where $E_0$ is Young's modulus in dynes/cm$^2$
P is density in gm/cm$^3$
$K$ is a constant greater than 1 which is the ratio of the arc of the cell to $l_2$
$h$ is the thickness of the individual cell wall
$l_1$ is the height of the individual cell in the direction of propagation, and
$l_2$ is the length of the individual cell transverse to the direction of propagation.
and then converting said elastic waves into electrical output signals.

2. The method of claim 1 wherein the elastic waves are focused in a preselected pattern by selectively varying the combination of $h$, $l_1$, and $l_2$.

* * * * *